(12) United States Patent
Jonnadula et al.

(10) Patent No.: US 11,966,721 B2
(45) Date of Patent: Apr. 23, 2024

(54) EXTENDED REALITY PLATFORM AND MACHINE LEARNING ENGINE FOR AUTOMATED CODE ERROR RESOLUTION

(71) Applicant: BANK OF AMERICA CORPORATION, Charlotte, NC (US)

(72) Inventors: Satya Jonnadula, Simi Valley, CA (US); Srinath Nelakuditi, Telangana (IN); Kalyan Pallapolu, Telangana (IN); Gali Mohan Sreenivas, Andhra Pradesh (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 155 days.

(21) Appl. No.: 17/862,727

(22) Filed: Jul. 12, 2022

(65) Prior Publication Data
US 2024/0020098 A1 Jan. 18, 2024

(51) Int. Cl.
| | | |
|---|---|---|
| G06F 9/44 | (2018.01) | |
| G06F 8/33 | (2018.01) | |
| G06F 8/34 | (2018.01) | |
| G06T 19/00 | (2011.01) | |

(52) U.S. Cl.
CPC .................. *G06F 8/34* (2013.01); *G06F 8/33* (2013.01); *G06T 19/006* (2013.01)

(58) Field of Classification Search
CPC ........................................................ G06F 8/34
See application file for complete search history.

(56) References Cited

U.S. PATENT DOCUMENTS

| | | | |
|---|---|---|---|
| 6,026,362 A | 2/2000 | Kim et al. | |
| 6,427,228 B1 | 7/2002 | Wigger | |
| 8,191,044 B1* | 5/2012 | Berlik | G06F 11/3672 |
| | | | 717/124 |
| 8,745,591 B2 | 6/2014 | De Smet et al. | |
| 9,160,762 B2 | 10/2015 | Brake et al. | |
| 9,658,943 B2 | 5/2017 | Gounares | |
| 9,916,224 B2 | 3/2018 | Macleod et al. | |
| 10,162,730 B2 | 12/2018 | Kulkarni et al. | |
| 10,241,808 B2 | 3/2019 | Kolagatla et al. | |
| 10,289,409 B2 | 5/2019 | Mandava et al. | |
| 10,303,517 B1 | 5/2019 | Sloyan et al. | |
| 10,318,412 B1 | 6/2019 | Mckearney, Jr. et al. | |

(Continued)

*Primary Examiner* — Hang Pan
(74) *Attorney, Agent, or Firm* — Moore & Van Allen PLLC; Gabrielle M. Carlini (57) ABSTRACT

Systems, computer program products, and methods are described herein for automated code resolution in an extended reality environment. The present invention allows a user (such as a software developer) to view source code discrepancies in real time using an extended reality (XR) environment. In this regard, the present invention focuses on electronic applications (and the electronic work products/electronic data hosted thereon) and represents a combined view of real-time applications and application requirements within an XR environment. A user may then visualize discrepancies between the current application and the application requirements via an XR platform (accessible using a virtual/augmented/mixed reality device) and proactively make edits, approvals, or otherwise interact with said application. The system may also be configured to automatically alter the source code to resolve said discrepancies.

20 Claims, 2 Drawing Sheets

(56) References Cited

U.S. PATENT DOCUMENTS

| | | |
|---|---|---|
| 10,394,689 B1 | 8/2019 | Ledet |
| 10,459,695 B2 | 10/2019 | Hauser |
| 10,585,663 B1 | 3/2020 | Anderson et al. |
| 10,585,780 B2 | 3/2020 | Woulfe et al. |
| 10,592,391 B1 | 3/2020 | Anderson et al. |
| 10,754,640 B2 | 6/2020 | Woulfe et al. |
| 10,705,950 B2 | 7/2020 | Rossler |
| 10,802,946 B2 | 10/2020 | Mola |
| 10,846,082 B2 | 11/2020 | Fan et al. |
| 10,990,508 B2 | 4/2021 | Wang et al. |
| 11,074,043 B2 | 7/2021 | Bulut et al. |
| 11,080,179 B2 | 8/2021 | Landsborough et al. |
| 11,157,844 B2 | 10/2021 | Stevens |
| 11,163,731 B1 | 11/2021 | Riddell |
| 11,216,342 B2 | 1/2022 | Scoda |
| 11,262,983 B2 | 3/2022 | Kuris et al. |
| 11,288,592 B2 | 3/2022 | Woulfe et al. |
| 2011/0296388 A1* | 12/2011 | Rohde ................ G06F 11/3604 717/131 |
| 2013/0007701 A1 | 1/2013 | Sundararam |
| 2015/0074633 A1 | 3/2015 | Slack et al. |
| 2015/0199262 A1 | 7/2015 | Bhavsar et al. |
| 2017/0109933 A1 | 4/2017 | Voorhees et al. |
| 2018/0137667 A1 | 5/2018 | Kindelsberger et al. |
| 2018/0365125 A1 | 12/2018 | Mola |
| 2019/0095292 A1* | 3/2019 | Mangu ..................... G06F 8/34 |
| 2019/0228319 A1 | 7/2019 | Gupta et al. |
| 2019/0303110 A1* | 10/2019 | Brude ................... G06F 3/0484 |
| 2019/0369849 A1 | 12/2019 | Gonzalez et al. |
| 2020/0218520 A1 | 7/2020 | Webb |
| 2020/0233648 A1 | 7/2020 | Bonas |
| 2020/0278862 A1 | 9/2020 | Webb |
| 2023/0063753 A1* | 3/2023 | Karri .................. G06F 11/3664 |

\* cited by examiner

EXTENDED REALITY PLATFORM AND MACHINE LEARNING ENGINE FOR AUTOMATED CODE ERROR RESOLUTION

FIELD OF THE INVENTION

The present invention embraces a system for automated code error resolution in an extended reality environment.

BACKGROUND

There is a need for a system for that automatically resolves discrepancies discovered during application validation processes.

SUMMARY

The following presents a simplified summary of one or more embodiments of the present invention, in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for automated code resolution in an extended reality environment is presented. The system comprising: at least one non-transitory storage device storing an extended reality platform; and at least one processing device coupled to the at least one non-transitory storage device, wherein the at least one processing device is configured to: electronically receive a first user input comprising a selection of an error; build a first display based on a plurality of application requirements associated with the error; build a second display based on a source code associated with the error; identify, via a first machine learning algorithm, a plurality of first objects associated with the first display and a plurality of second objects associated with the second display; identify a plurality of first extended reality (XR) objects, where each first XR object is associated with one of the plurality of first objects and a plurality of second XR objects, where each second XR objects are associated with each of the plurality of second objects; build a first XR display using the plurality of first XR objects and a second XR display using the plurality of second XR objects; and indicate, via the XR platform, at least one discrepancy between the first XR display and the second XR display.

In some embodiments, the at least one processing device is further configured to display, in response to a second user input, a suggested alternation associated with the at least one discrepancy.

In some embodiments, the processing device is further configured to determine the suggested alteration based on a second machine learning engine.

In some embodiments, the error is selected from a list of pending application errors.

In some embodiments, identifying a plurality of first XR objects and a plurality of second XR objects comprises querying a database.

In some embodiments, the database comprises a first set of metadata associated with a plurality of objects and a second set of metadata associated with a plurality of XR objects.

In some embodiments, the at least one processing device is further configured to automatically implement the suggested alteration to the source code associated with the error.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for managing electronic workflows. Typically, these workflows can be related to the people who work for the organization, its products or services, the customers or any other aspect of the operations of the organization. As such, the entity may be any institution, group, association, financial institution, establishment, company, union, authority or the like, employing information technology resources for managing electronic workflows.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

Figure 1:
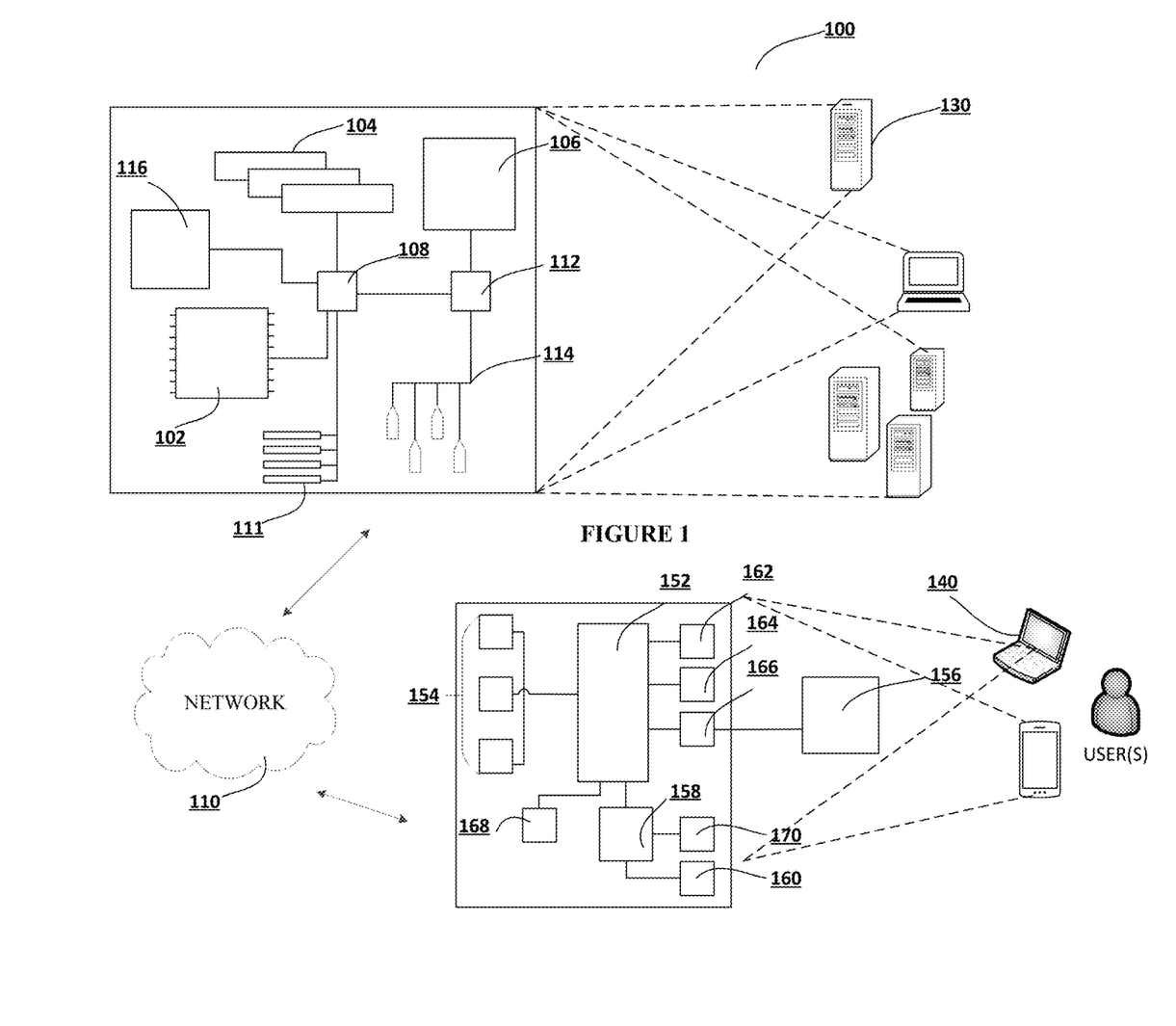
FIG. 1 illustrates technical components of a system for automated code error resolution in an extended reality environment, in accordance with an embodiment of the invention.

FIG. 1 presents an exemplary block diagram of the system environment for automated code error resolution in an extended reality environment 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input system 140. Also shown in FIG. 1 is one or more user(s) of the user input system 140. The user input system 140 is intended to represent various forms of mobile devices, such as laptops, personal digital assistants, augmented reality (AR) devices, virtual reality (VR) devices, extended reality (XR) devices, and/or the like, and non-mobile devices such as desktops, video recorders, audio/video player, radio, workstations, and/or the like. The user may be a person who uses the user input system 140 to execute one or more processes described herein using one or more applications stored thereon. The one or more applications may be configured to communicate with the system 130, execute a process or method, input information onto a user interface presented on the user input system 140, or the like. The applications stored on the user input system 140 and the system 130 may incorporate one or more parts of any process flow described herein.

As shown in FIG. 1, the system 130, and the user input system 140 are each operatively and selectively connected to the network 110, which may include one or more separate networks. In addition, the network 110 may include a telecommunication network, local area network (LAN), a wide area network (WAN), and/or a global area network (GAN), such as the Internet. It will also be understood that the network 110 may be secure and/or unsecure and may also include wireless and/or wired and/or optical interconnection technology.

In some embodiments, the system 130 and the user input system 140 may be used to implement the processes described herein, including the mobile-side and server-side processes for installing a computer program from a mobile device to a computer, in accordance with an embodiment of the present invention. The system 130 is intended to represent various forms of digital computers, such as laptops, desktops, workstations, electronic kiosk devices, blade servers, mainframes, or any combination of the aforementioned. The user input system 140 is intended to represent various forms of personal devices, such as laptops, desktops, mobile devices, smartphones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by an entity. The system 130 may be located at a facility associated with the entity or remotely from the facility associated with the entity.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

In some embodiments, the system 130 may be configured to access, via the 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, it appears as though the memory is being allocated from a central pool of memory, even though the space is distributed throughout the system. This method of dynamically allocating memory provides increased flexibility when the data size changes during the lifetime of an application and allows memory reuse for better utilization of the memory resources when the data sizes are large.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 140 may be made up of multiple computing devices communicating with each other.

FIG. 1 also illustrates a user input system 140, in accordance with an embodiment of the invention. The user input system 140 includes a processor 152, memory 154, an input/output device such as a display 156, a communication interface 158, and a transceiver 160, among other components. The user input system 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input system 140, including instructions stored in the memory 154. The processor may be implemented as a chipset of chips that include separate and multiple analog and digital processors. The processor may be configured to provide, for example, for coordination of the other components of the user input system 140, such as control of user interfaces, applications run by user input system 140, and wireless communication by user input system 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input system 140 with other devices. External interface 168 may provide, for example, for wired communication in some implementations, or for wireless communication in other implementations, and multiple interfaces may also be used.

The memory 154 stores information within the user input system 140. The memory 154 can be implemented as one or more of a computer-readable medium or media, a volatile memory unit or units, or a non-volatile memory unit or units. Expansion memory may also be provided and connected to user input system 140 through an expansion interface (not shown), which may include, for example, a SIMM (Single In Line Memory Module) card interface. Such expansion memory may provide extra storage space for user input system 140, or may also store applications or other information therein. In some embodiments, expansion memory may include instructions to carry out or supplement the processes described above, and may include secure information also. For example, expansion memory may be provided as a security module for user input system 140, and may be programmed with instructions that permit secure use of user input system 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flow discussed in greater detail with respect to FIG. 2. It will be understood that the one or more applications stored in the system 130 and/or the user computing system 140 may interact with one another and may be configured to implement any one or more portions of the various user interfaces and/or process flow described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input system 140 to transmit and/or receive information or commands to and from the system 130. In this regard, the system 130 may be configured to establish a communication link with the user input system 140, whereby the communication link establishes a data channel (wired or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, or the like.

The user input system 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation- and location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker, e.g., in a handset of user input system 140. Such sound may include sound from voice telephone calls, may include recorded sound (e.g., voice messages, music files, etc.) and may also include sound generated by one or more applications operating on the user input system 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

It will be understood that the embodiment of the system environment illustrated in FIG. 1 is exemplary and that other embodiments may vary. As another example, in some embodiments, the system 130 includes more, less, or different components. As another example, in some embodiments, some or all of the portions of the system environment 100 may be combined into a single portion. Likewise, in some embodiments, some or all of the portions of the system 130 may be separated into two or more distinct portions.

Many electronic workflows associated with application development require multiple users to be able to access, view, manipulate, and otherwise engage with data and applications. To ensure the quality of a work product, users often log errors or bugs in a queue. Before an error can be remediated, another user must select the error from the queue, then manually attempt to recreate the error to identify discrepancies between the existing application and the application requirements. Not only can this method cause significant delays in a process, but it also leaves substantial room for human error if a user is unable to accurately recreate the error. The ability to visualize a code error can significantly reduce the time it takes for error resolution. One potential visualization technique is an Extended Reality (XR) platform. XR offers distinct advantages over conventional "screen-sharing" approaches. Techniques for customizing views, visualizing data, and communicating with other users are much more immersive, and the intuitive user interfaces bolster the effect of interactivity.

The present invention provides the functional benefit of allowing a user (such as a software developer, supervisor, or editor) to visualize a code error in real-time using an extended reality (XR) environment. XR may refer to all real-and-virtual combined environments and human-machine interactions generated by computing technology and wearables. Representative forms of XR may include augmented reality (AR), virtual reality (VR), mixed reality (MR), and the areas interpolated among them. The levels of virtuality range from partially sensory inputs to immersive virtuality, also called VR. In this regard, the present invention focuses on electronic applications (and the electronic work products/electronic data hosted thereon) and represents a combined view of real-time applications and application requirements within an XR environment. A user may then visualize discrepancies between the current application and the application requirements via an XR platform (accessible using a virtual/augmented/mixed reality device) and proactively make edits, approvals, or otherwise interact with said application. The system may also be configured to automatically alter the source code to resolve said discrepancies.

Figure 2:
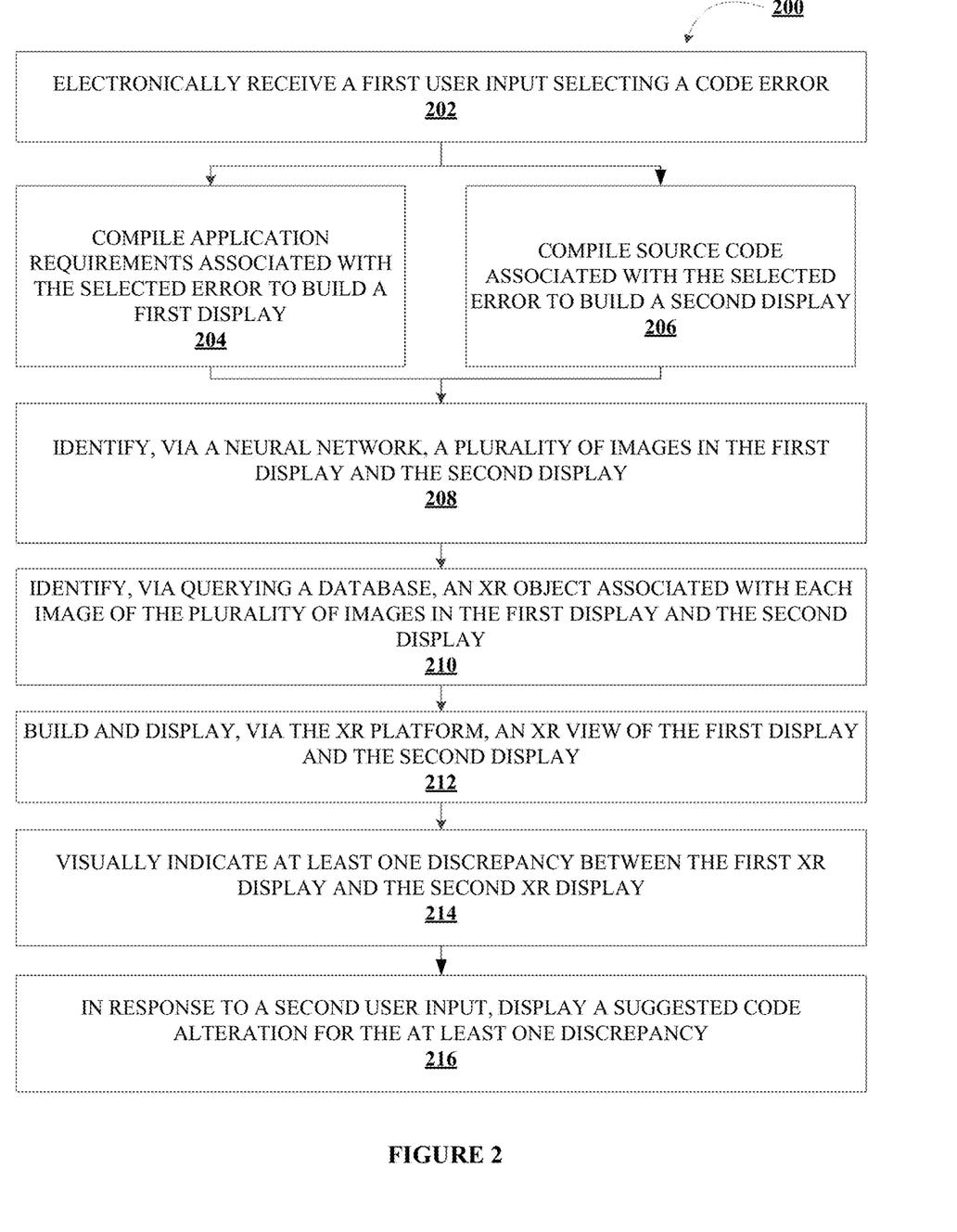
FIG. 2 illustrates a process flow for automated code error resolution in an extended reality environment in accordance with an embodiment of the invention.

FIG. 2 illustrates a process flow for automated code error resolution in an extended reality environment 200, in accordance with an embodiment of the invention. As shown in block 202, the process flow includes electronically receiving a first user input from a user, the user input comprising a selection of one or more code errors from a list of pending code errors. The user input may be received from a computing device associated with the user. In one aspect, the computing device associated with the user may be an XR device. An exemplary XR device may be a head-mounted device that provides a virtual reality platform for the user. Such a device may include a stereoscopic head-mounted display (providing separate images for each eye), surround sound, and head motion tracking sensors (which may include gyroscopes, accelerometers, magnetometers, structured light systems, etc.). The XR platform (e.g., AR platform and/or VR platform) may be a simulated virtual graphic user interface which presents a computer-generated immersive, three-dimensional, interactive environment that is accessed and manipulated using, the computing device.

Next, as shown in block 204, the process flow includes building a first display based on a plurality of application requirements associated with the selected error. For example, in some embodiments, each error in the list of pending code errors may be associated with a list of application requirements. Application requirements may define expected forms and functions for an application or module. For example, a first application requirement may require that a page of an application must display a drop-down menu in a particular position. A second application requirement may require that the drop-down menu changes colors when selected by a user. The system may compile all application requirements associated with the selected error and build a first display, or "ideal" display by converting the natural language of the application requirements to machine readable code, such as Python code or the like. The first display may represent a particular page or view of an application, conforming to all application requirements associated with that page or view.

Next, as shown in block 206, the process flow includes building a second display based on a source code associated with the selected error. For example, in some embodiments, each error in the list of pending code errors is associated with a source code, or current state of a particular application. In some embodiments, the system may build the second display by compiling the source code associated with the selected error, producing a "current" display of the application or page defined by the source code. Continuing with the previous example, the source code may result in a second display where a drop down is positioned differently from the first application requirement, or where the drop down does not change colors as required by the second application requirement.

Next, as shown in block 208, the system may identify, via a first machine learning algorithm, a plurality of first display objects or images in the first display and a plurality of second display objects in the second display. The machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or the like. The system may use the first machine learning algorithm in combination with a variety of image-processing techniques to identify display objects based on the first and second display. The first machine learning algorithm may also be used to identify functionality-based objects (such as a color change or transparency change) embedded within the first and/or second displays.

Next, as shown in block 210, the process flow includes identifying an XR object associated with each image or display object identified in block 208. In some embodiments, the system may identify XR objects by querying a database, where the database contains information characterizing display objects and associated XR objects. For example, the database may contain metadata associated with both display objects and XR objects, such that the system may query the database based on known metadata of the identified display objects. The database may then return XR metadata associated with the matching XR objects. The XR metadata may contain code enabling the system to build an XR object as is discussed in greater detail with respect to block 212. In some embodiments, the system may query the database for all display objects associated with the first display and then query the database for all display objects associated with the second display. In some embodiments, the system may identify, via the neural network, display objects that are common to both the first and second displays. The system may then remove said objects from the second query, reducing the computational power required to complete block 210.

Next, as shown in block 212, the process flow includes building and displaying, via the XR platform, an XR view of the first display, or a first XR display, and an XR view of the second display, or a second XR display. In some embodiments, the system may compile the code contained in the metadata associated with each XR object. After compilation, the system may build a first XR display corresponding to the first display and a second XR display corresponding to the second XR display. The system may display the first and second XR displays via the XR platform for visualization by the user. In some embodiments, the first and second XR displays may be displayed side-by-side, superimposed over one another, in two different display pages, and/or in any other configuration.

Next, as shown in block 214, the process flow includes indicating at least one discrepancy between the first and second XR displays. A discrepancy may correspond to the selected error. For example, continuing with the above example, the system may indicate that in the first XR display, a drop-down menu is located at a particular location on a page, while in the second XR display, a drop-down menu is located at a different location on the page. In some embodiments, the system may identify discrepancies using a variety of image-processing techniques. In some embodiments, the system may visually indicate discrepancies, for example, by highlighting differences between the first and second XR displays. Additionally or alternatively, the system may textually indicate discrepancies, for example, by displaying a notification describing the differences between the first and second XR displays.

Finally, as shown in block 216, the system may receive a second user input, where the second user input comprises a selection of an identified discrepancy and a request to resolve the discrepancy. The system may then display a suggested code alteration for the selected discrepancy. In some embodiments, the system may determine a suggested code alteration via a second machine learning engine, where the second machine learning algorithm is configured to analyze metadata associated with the discrepancy and predict a source code alteration which would result in resolution of the discrepancy. Continuing with the above example, the second machine learning algorithm may predict that a particular value of a source code variable would result in a drop-down menu being positioned in the same place in both the first and second XR displays, resolving the discrepancy. The system may display the suggested alteration to the user in the form of a notification or may be configured to automatically implement the alteration to the source code associated with the selected error.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for automated code resolution in an extended reality environment, the system comprising:
   at least one non-transitory storage device storing an extended reality platform; and
   at least one processing device coupled to the at least one non-transitory storage device, wherein the at least one processing device is configured to:
   electronically receive a first user input comprising a selection of an error;
   build a first display based on a plurality of application requirements associated with the error;
   build a second display based on a source code associated with the error;
   identify, via a first machine learning algorithm, a plurality of first objects associated with the first display and a plurality of second objects associated with the second display;
   identify a plurality of first extended reality (XR) objects, wherein each first XR object is associated with one of the plurality of first objects and a plurality of second XR objects, wherein each second XR objects are associated with each of the plurality of second objects;
   build a first XR display using the plurality of first XR objects and a second XR display using the plurality of second XR objects; and
   indicate, via the XR platform, at least one discrepancy between the first XR display and the second XR display.

2. The system of claim 1, wherein the at least one processing device is further configured to:
   display, in response to a second user input, a suggested alternation associated with the at least one discrepancy.

3. The system of claim 2, wherein the processing device is further configured to determine the suggested alteration based on a second machine learning engine.

4. The system of claim 1, wherein the error is selected from a list of pending application errors.

5. The system of claim 1, wherein identifying a plurality of first XR objects and a plurality of second XR objects comprises querying a database.

6. The system of claim 5, wherein the database comprises a first set of metadata associated with a plurality of objects and a second set of metadata associated with a plurality of XR objects.

7. The system of claim 2, wherein the at least one processing device is further configured to automatically implement the suggested alteration to the source code associated with the error.

8. A computer program product for automated code resolution in an extended reality environment, the computer program product comprising a non-transitory computer-readable medium comprising code causing a first apparatus to:
   electronically receive a first user input comprising a selection of an error;

build a first display based on a plurality of application requirements associated with the error;
build a second display based on a source code associated with the error;
identify, via a first machine learning algorithm, a plurality of first objects associated with the first display and a plurality of second objects associated with the second display;
identify a plurality of first extended reality (XR) objects, wherein each first XR object is associated with one of the plurality of first objects and a plurality of second XR objects, wherein each second XR objects are associated with each of the plurality of second objects;
build a first XR display using the plurality of first XR objects and a second XR display using the plurality of second XR objects; and
indicate, via the XR platform, at least one discrepancy between the first XR display and the second XR display.

9. The computer program product of claim 8, wherein the first apparatus is further configured to:
display, in response to a second user input, a suggested alternation associated with the at least one discrepancy.

10. The computer program product of claim 9, wherein the first apparatus is further configured to:
determine the suggested alteration based on a second machine learning engine.

11. The computer program product of claim 8, wherein the error is selected from a list of pending application errors.

12. The computer program product of claim 8, wherein identifying a plurality of first XR objects and a plurality of second XR objects comprises querying a database.

13. The computer program product of claim 12, wherein the database comprises a first set of metadata associated with a plurality of objects and a second set of metadata associated with a plurality of XR objects.

14. The computer program product of claim 9, wherein the first apparatus is further configured to:
automatically implement the suggested alteration to the source code associated with the error.

15. A method for automated code resolution in an extended reality environment, the method comprising:
electronically receiving a first user input comprising a selection of an error;
building a first display based on a plurality of application requirements associated with the error;
building a second display based on a source code associated with the error;
identifying, via a first machine learning algorithm, a plurality of first objects associated with the first display and a plurality of second objects associated with the second display;
identifying a plurality of first extended reality (XR) objects, wherein each first XR object is associated with one of the plurality of first objects and a plurality of second XR objects, wherein each second XR objects are associated with each of the plurality of second objects;
building a first XR display using the plurality of first XR objects and a second XR display using the plurality of second XR objects; and
indicating, via the XR platform, at least one discrepancy between the first XR display and the second XR display.

16. The method of claim 15, further comprising:
displaying, in response to a second user input, a suggested alternation associated with the at least one discrepancy.

17. The method of claim 16, further comprising:
determining the suggested alteration based on a second machine learning engine.

18. The method of claim 15, wherein the error is selected from a list of pending application errors.

19. The method of claim 15, wherein identifying a plurality of first XR objects and a plurality of second XR objects comprises querying a database, wherein the database comprises a first set of metadata associated with a plurality of objects and a second set of metadata associated with a plurality of XR objects.

20. The method of claim 16, further comprising:
automatically implementing the suggested alteration to the source code associated with the error.

* * * * *